United States Patent [19]
Mayo

[11] Patent Number: 5,951,034
[45] Date of Patent: Sep. 14, 1999

[54] SEMI-RECUMBENT BICYCLE AND CONVERSION KIT

[76] Inventor: Todd T Mayo, 13214 Burleigh St., Upper Marlboro, Md. 20774

[21] Appl. No.: 08/821,538

[22] Filed: Mar. 21, 1997

[51] Int. Cl.⁶ .................................................. B62K 13/00
[52] U.S. Cl. ...................... 280/288.1; 280/287; 280/7.15
[58] Field of Search ................................ 280/287, 288.1, 280/30, 7.1, 7.11, 7.15, 7.16, 7.17

[56] References Cited

U.S. PATENT DOCUMENTS

| | | |
|---|---|---|
| D. 148,055 | 12/1947 | Eubank . |
| D. 278,324 | 4/1985 | Breen . |
| 558,069 | 4/1896 | Heaton ................................... 280/7.16 |
| 575,692 | 1/1897 | Buell ...................................... 280/7.16 |
| 637,768 | 11/1899 | Dermody ................................ 280/287 |
| 690,733 | 1/1902 | Jarvis ................................... 280/288.1 |
| 2,147,732 | 2/1939 | Boynton ............................... 280/288.1 |
| 2,458,127 | 1/1949 | Ahrens . |
| 2,485,472 | 9/1949 | Fried . |
| 3,493,241 | 2/1970 | Hermsdorfer . |
| 3,623,749 | 11/1971 | Jensen . |
| 3,658,354 | 4/1972 | Read . |
| 3,694,004 | 9/1972 | Siebers . |
| 3,753,577 | 8/1973 | Robinson . |
| 4,108,460 | 8/1978 | Silva, Jr. . |
| 4,129,317 | 12/1978 | Bell . |
| 4,248,448 | 2/1981 | Dmitrowsky . |
| 4,283,070 | 8/1981 | Forrestall et al. . |
| 4,303,256 | 12/1981 | Mortensen . |
| 4,480,848 | 11/1984 | Georgiev .............................. 280/288.1 |
| 4,502,705 | 3/1985 | Weaver .................................. 280/231 |
| 4,647,059 | 3/1987 | Hai . |
| 4,657,270 | 4/1987 | Allen et al. . |
| 4,659,098 | 4/1987 | Jacobson . |
| 4,691,930 | 9/1987 | Samuel . |
| 4,700,962 | 10/1987 | Salmon . |
| 4,786,070 | 11/1988 | Adee . |
| 5,261,686 | 11/1993 | Buckler . |
| 5,290,054 | 3/1994 | Po ....................................... 280/288.1 |
| 5,419,574 | 5/1995 | Krumm . |
| 5,509,678 | 4/1996 | Ullman et al. . |
| 5,516,134 | 5/1996 | Crawford et al. . |

OTHER PUBLICATIONS

Bicycle, printed pp. 1–2, The 1998 Grolier Multimedia Encyclopedia, version 10.00M, copyright 1998 by Grolier Interactive, Inc.
RCN, Recumbent Cyclist News, Mar./Apr. 1997, RCN #38, pp. 7–11, p. 73.

*Primary Examiner*—Kevin Hurley

[57] ABSTRACT

The present invention relates to semi-recumbent bicyles. A regular upright bicyle is transformed in to a semi-recumbent style bicycle with a minimum number of new parts. An extension appliance, a seat assembly, an extended-length brake and derailleur cables, an extended-length chain, and an extended-length handlebar are used to completely convert a standard bicycle to a semi-recumbent bicyle. The extention appliance connects to the head tube of the standard bicycle. The handle bars and forks of the standard bicyle are relocated to a forward position in the extention applicance. The crank and front sprocket are relocated to a new crank case in the extension appliance. An extended-length chain is used to connect the front sprocket in the new position to the rear sprocket. Extended-length brake and derailleur cables are added if necessary. A new set assebly may be added. This new set assembly includes a back rest portion. An extended-length handlebar may be added if necessary.

10 Claims, 4 Drawing Sheets

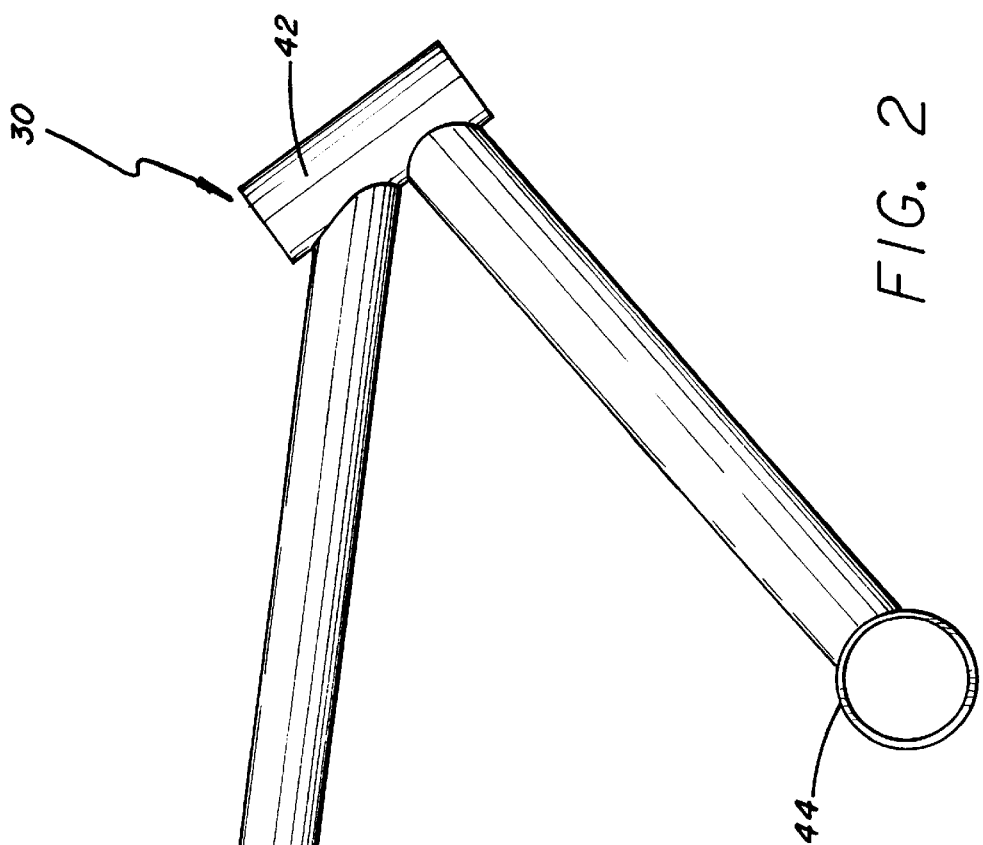
FIG. 2
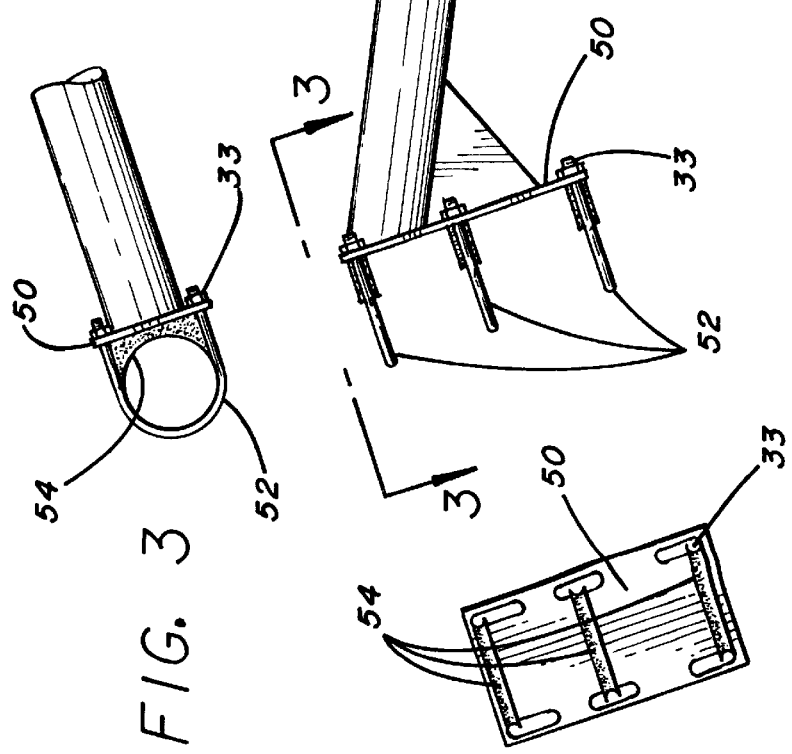
FIG. 3
FIG. 4

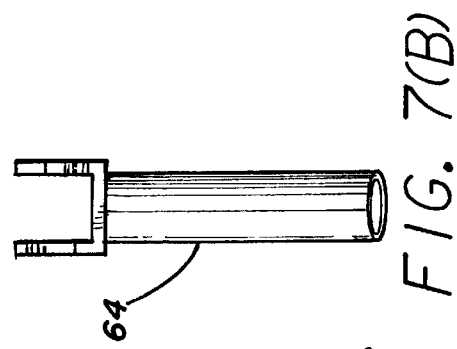
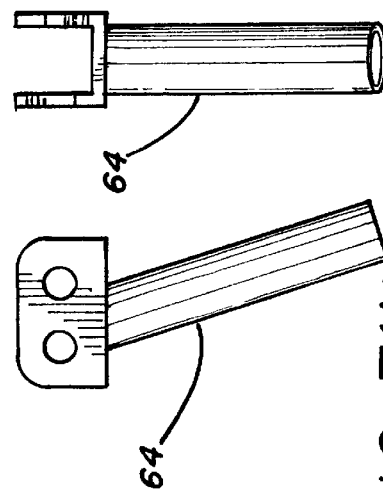
FIG. 7(A)
FIG. 7(B)
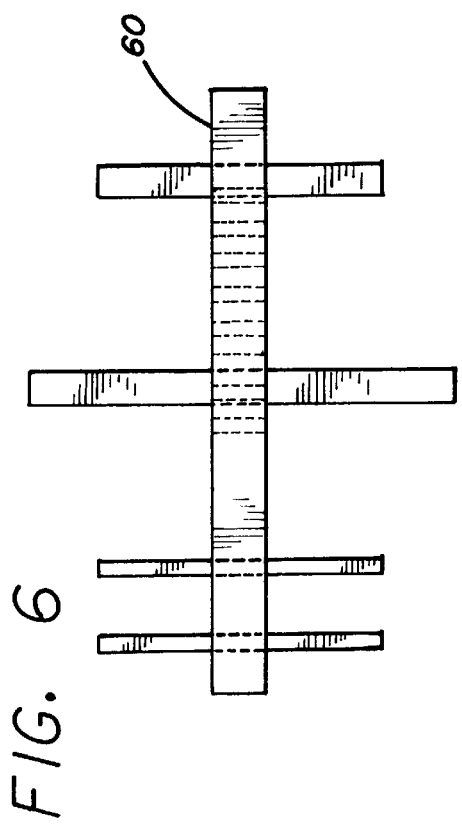
FIG. 6
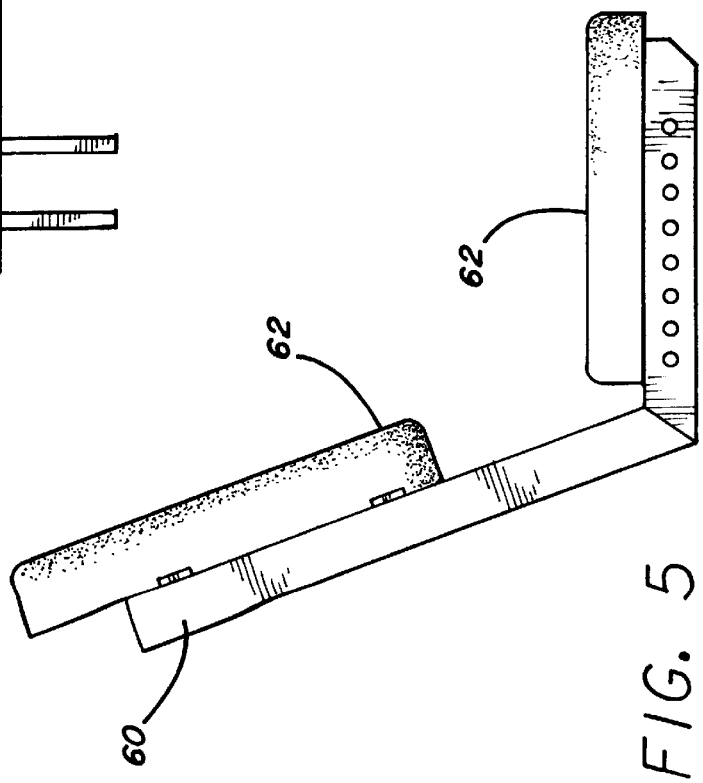
FIG. 5

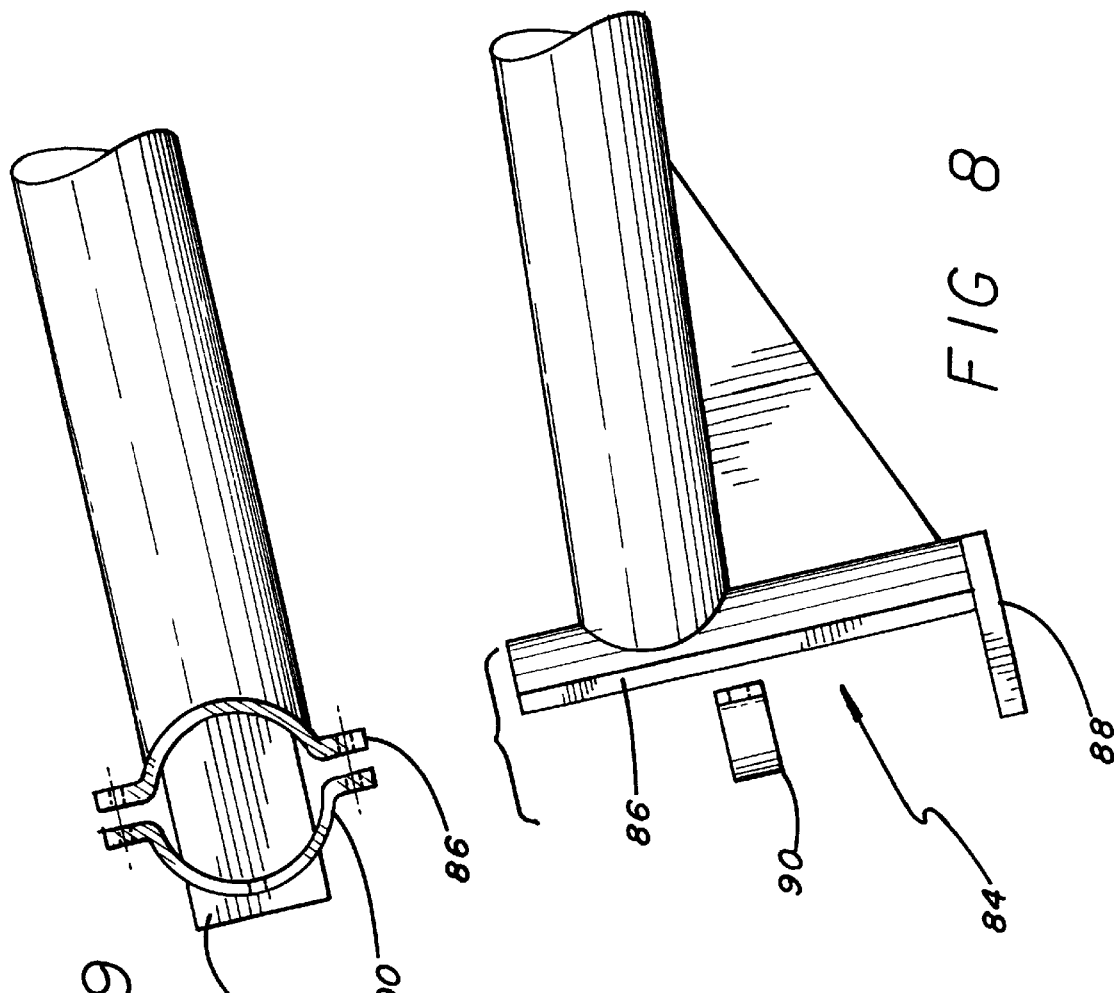
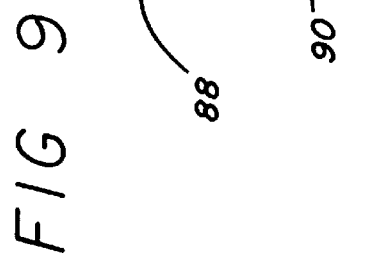
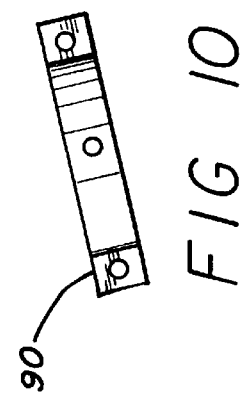

SEMI-RECUMBENT BICYCLE AND CONVERSION KIT

BACKGROUND OF THE INVENTION

The present invention relates generally to bicycles. More specifically, the present invention relates to a semi-recumbent bicycle created using safety bicycle parts and a kit for creating a semi-recumbent bicycle in combination with safety bicycle parts.

A bicycle is a two-wheeled vehicle which is self-propelled by its rider. Generally considered one of the most energy-efficient forms of transportation, the bicycle is used throughout the world, and particularly in developing countries—most notably China, where some 300 million bicycles are on the road.

The most traditional form of a bicycle is the "safety bicycle," which is generally considered to have been invented by H. J. Lawson in 1879. The safety bicycle includes a chain and sprocket driving a rear wheel, and generally has two wheels of equal size. Pedals to propel the safety bicycle are positioned below the seat of the rider, such that rider shifts the rider's weight from one foot to the other during forward propulsion. The safety bicycle is steered by handlebars which are attached to and positioned above the front wheel through connection by a head tube. The rider's torso and the handlebars are both positioned above the front wheel. Improvements to the safety bicycle include the use of pneumatic tires in the 1880s, three-speed hub gears in the 1890s, and a derailleur system in 1899. The derailleur system is a sophisticated gearshift that allows the bicycle chain to be shifted among sprockets of different sizes on front and rear hubs.

In general, a longer wheelbase and a lower center of gravity provide greater stability. A relatively new design, the recumbent bicycle, is generally longer than a conventional safety bicycle, positions the rider in a lower position to the ground, and is characterized by the rider sitting slightly reclined in a high-backed seat. The recumbent bicycle provides increased comfort, greater pedal efficiency, and a lower center of gravity when compared with the conventional safety bicycle.

The Recumbent Bicyclist News, RCN, characterizes single rider recumbent bicycles into three types, namely a Short Wheelbase (SWB), a Compact Long Wheelbase (CLWB), and a Long Wheelbase (LWB). The SWB recumbent bicycles are characterized by being between 33"–47" in length, with the pedal crank being placed ahead of the head tube, such that the front wheel is tucked underneath or just ahead of the rider's knees. The CLWB recumbent bicycle is between 47"–60", provides the front wheel ahead of the pedal crank, and maintains a relatively short wheelbase. To provide for this relatively short wheelbase, the CLWB recumbent bicycle seat is generally positioned higher on the bicycle above the pedal crank. The CLWB recumbent bicycle may have the rear wheel being 20" with the front wheel being 16". The CLWB recumbent bicycle may also have a dual 20" wheel configuration. The CLWB recumbent bicycle offers a higher seat and lower pedal crank, which makes provides for easier riding, especially for the novice. The CLWB recumbent bicycle also offers higher rider placement for better visibility. The LWB recumbent bicycle is 60"–71+" and is characterized by the front wheel being placed ahead of the pedal crank. The rear wheel is generally 26" while the front wheel is usually 20". Due to the longer wheelbase, the LWB recumbent bicycle generally has a lower center of gravity, but sacrifices maneuverability.

SUMMARY OF THE INVENTION

The present invention relates to semi-recumbent bicyles. A regular upright bicyle is transformed in to a semi-recumbent style bicycle with a minimum number of new parts. An extension appliance, a seat assembly, an extended-length brake and derailleur cables, an extended-length chain, and an extended-length handlebar are used to convert a safety bicycle into a semi-recumbent bicyle. The extention appliance connects to the head tube of the safety bicycle. The handle bars and forks of the safety bicyle are relocated to a forward position in the extention applicance. The crank and front sprocket are relocated to a new crank case in the extension appliance. An extended-length chain is used to connect the front sprocket in the new position to the rear sprocket. Extended-length brake and derailleur cables are added, if necessary. A new horizontally and vertically adjustable seat assembly may also be added. This new seat assembly includes a back rest portion. An extended-length handlebar may also be added if necessary.

BRIEF DESCRIPTION OF DRAWINGS

FIG. 2 shows a detail side view of an extension appliance including a safety head tube connection means.

FIG. 3 shows a top view of the head tube connecting means taken along line III—III of FIG. 2.

FIG. 4 shows a front view of the head tube connecting means.

FIG. 5 shows a side view of the seat assembly.

FIG. 6 shows a bottom view of the seat assembly.

FIGS. 7(A) and 7(B) show detail views of the seat tube for the seat assembly.

FIG. 8 shows a side view of an alternative connection means.

FIG. 9 shows a top view of an alternative connection means.

FIG. 10 shows the clamping ring for the alternative connection means.

DESCRIPTION OF PREFERRED EMBODIMENTS

Figure 1:
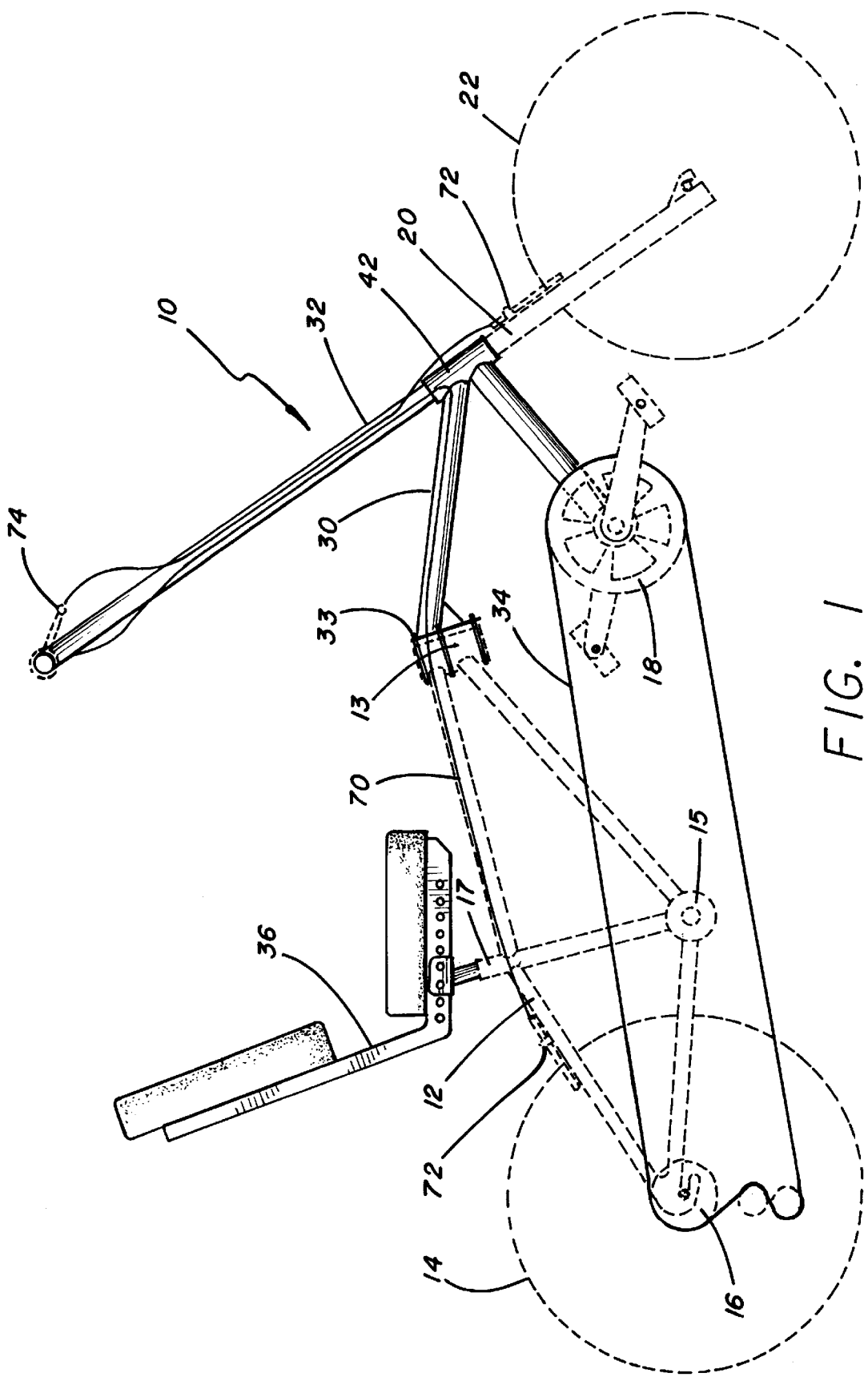
FIG. 1 shows a side view of the present invention with safety bicycle parts darkened.

The converted bike 10 of the present invention is shown by FIG. 1. The converted bike 10 includes several safety bicycle parts (shown by dashed lines). The word "standard is used" to distinguish between a safety bicycle part and a semi-recumbent or recumbent bicycle part. The standard bicycle frame 12, the standard rear wheel 14, the standard rear sprocket 16, the standard crank assembly 18, the standard front forks 20, and the standard front wheel 22 from a safety bicycle are all retained. The conversion kit for the safety bicycle includes an extension appliance 30, extended length handle bars 32, an extended length chain 34, and a seat assembly 36. These new parts are shown by solid lines. The standard bicycle frame 12 includes a standard head tube 13, a standard crank case 15, a standard rear sprocket 16 and a standard seat tube 17.

FIG. 2 shows a side view detail of the extension appliance 30. The extension appliance 30 includes a connection means 33 (for connecting the extension appliance 30 to the standard head tube 13), a forwardly disposed head tube 42, and a forwardly disposed crank case 44. The extension appliance 30 may optionally include a front derailleur stalk (not shown).

The connection means 33 includes a support plate 50, "U" shaped bolts 52, and fitted spacers 54. The support plate 50 is mounted to the extension appliance 30 and mounted to the support plate 50 are the fitted spacers 54. These spacers allow the standard head tube 42 which generally has a circular outer circumference to mount securely to the support plate 50. The standard head tube 42 is held securely to the fitted spacers 54 by "U" shaped bolts 52.

FIG. 8 shows an alternative embodiment in which connection means 84 may be used. The alternative connection means 84 includes a U-shaped support plate 86, a head tube stop 88, and a U-shaped clamp 90. The standard head tube 13 is pressed against the support plate 86 by the clamp 90. The support plate 86 and the clamp 90 both have holes which line up. They can be bolted together to hold the standard head tube 13 in place. The bottom of the standard head tube 13 rests on the head tube stop 88.

In FIGS. 5, 6, 7(A) and 7(B), the seat assembly 36 including its components are shown. The seat assembly 36 includes a seat frame 60, seat cushions 62, and a seat post 64. The seat frame 60 is shaped to support a human body in a seated position or a reclined seated position. In other words, back support is provided. The seat post 64 fits into the standard seat tube 17 replacing the standard seat post (not shown). The seat post 64 includes a means for connecting to the seat frame 60. The seat cushions 62 mount to the seat frame 60. Together, these components replace the standard seat (not shown).

To install the conversion kit, and with reference to FIG. 1, the standard handle bars (not shown) and front forks 20 are removed from the standard head tube 13. The extension appliance 30 is mounted to the standard head tube 13 using the connection means 33. The extended length handle bars 32 are installed along with the front forks 20 in the forwardly disposed head tube 42. The standard seat (not shown) is removed from the standard seat tube 17 and the seat assembly 36 is installed by inserting the seat post 64 into the standard seat tube 17. The standard crank-assembly 18 is removed from the standard crank case 15 and then installed in the forwardly disposed crank case 44. The extended length chain 34 is now installed to connect the forwardly disposed crank case 44 to the rear sprocket 16. The standard chain (not shown), standard seat (not shown), and standard handle bars (not shown) can all be discarded. An extended length brake cable 70 can be connected between a standard brake handle 74 and standard brake assemblies 72 for the front wheel 22 and/or the rear wheel 14.

I claim:

1. A conversion kit for converting a safety bicycle into a recumbent bicycle, the safety bicycle having a frame defining a head tube, a seat tube, and a crank case, said safety bicycle further having a crank assembly, front forks, a rear sprocket, a chain, a seat, handle bars, said conversion kit comprising:

an extension appliance having a forwardly disposed head tube connected to a first tubular projecting member and a second tubular projecting member, wherein a distal end of the first projecting member is configured to mate with a support plate for connection to the head tube of the safety bicycle, a distal end of the second projecting member is configured to receive the crank assembly of the safety bicycle such that the pedal crank case of the safety bicycle is not used, and the forwardly disposed head tube is configured to mate with the handle bars and the front forks of the safety bicycle;

a seat having a back support and mating with the seat tube of the safety bicycle by way of a seat post; and a chain having sufficient length to connect the crank assembly to the rear sprocket upon connection of the extension appliance to the head tube of the safety bicycle.

2. The conversion kit according to claim 1, further comprising:

fitted spacers mounted on said support plate; and

"U" shaped bolts pressing the head tube of the safety bicycle against the fitted spacers such that the extension appliance is rigidly mounted.

3. The conversion kit according to claim 1, wherein said seat having the back support further comprises a seat frame and seat cushions for supporting the human body in a seated position.

4. The conversion kit according to claim 1, further comprising extended-length handle bars, wherein said extended length handle bars are mountable to said forwardly disposed head tube of the extension appliance thereby replacing the handle bars of the safety bicycle.

5. A conversion kit for converting a safety bicycle into a recumbent bicycle, comprising:

an extension appliance having a support plate including a plurality of fitted spacers and a plurality of corresponding "U" shaped bolts which press a head tube of the safety bicycle against the fitted spacers to rigidly mount the extension appliance, a forwardly disposed head tube for receiving handle bars and front forks from the safety bicycle, and a crank case for receiving a crank assembly from the safety bicycle;

a seat having a back support and mating with a seat tube of the safety bicycle by way of a seat post; and a chain having sufficient length to connect the crank assembly to a rear sprocket of the safety bicycle upon connection of the extension appliance to the head tube.

6. The conversion kit according to claim 5, wherein said seat having the back support further comprises a seat frame and seat cushions for supporting the human body in a seated position.

7. The conversion kit according to claim 5 further comprising extended-length handle bars, wherein said extended length handle bars are mountable to said forwardly disposed head tube of the extension appliance thereby replacing the handle bars of the safety bicycle.

8. A conversion kit for converting a safety bicycle into a recumbent bicycle, the safety bicycle having a frame defining a head tube, a seat tube, and a crank case, said safety bicycle further having a crank assembly, front forks, and a rear sprocket, said conversion kit comprising:

an extension appliance having a forwardly disposed head tube connected to a first tubular projecting member and a second tubular projecting member, wherein a distal end of the first projecting member is configured to mate with a support plate for connection to the head tube of the safety bicycle, a distal end of the second projecting member is configured to receive the crank assembly of the safety bicycle such that the pedal crank case of the safety bicycle is not used, and the forwardly disposed head tube is configured to mate with the front forks of the safety bicycle;

extended-length handle bars which are mountable to said forwardly disposed head tube of the extension appliance;

a seat having a back support and mating with the seat tube of the safety bicycle by way of a seat post; and a chain having sufficient length to connect the crank assembly to the rear sprocket upon connection of the extension appliance to the head tube of the safety bicycle.

9. The conversion kit according to claim 8, further comprising:
- fitted spacers mounted on said support plate; and
- "U" shaped bolts pressing the head tube of the safety bicycle against the fitted spacers such that the extension appliance is rigidly mounted.

10. The conversion kit according to claim 8, wherein said seat having the back support further comprises a seat frame and seat cushions for supporting the human body in a seated position.

* * * * *